J. PEAVY.
TRAP.
APPLICATION FILED JULY 25, 1919.

1,330,338.

Patented Feb. 10, 1920.
2 SHEETS—SHEET 1.

WITNESSES
Guy M. Spring
W. H. Mulligan

Inventor
JOSIAH PEAVY

By Richard B. Owen
Attorney

J. PEAVY.
TRAP.
APPLICATION FILED JULY 25, 1919.
1,330,338.
Patented Feb. 10, 1920.
2 SHEETS—SHEET 2.
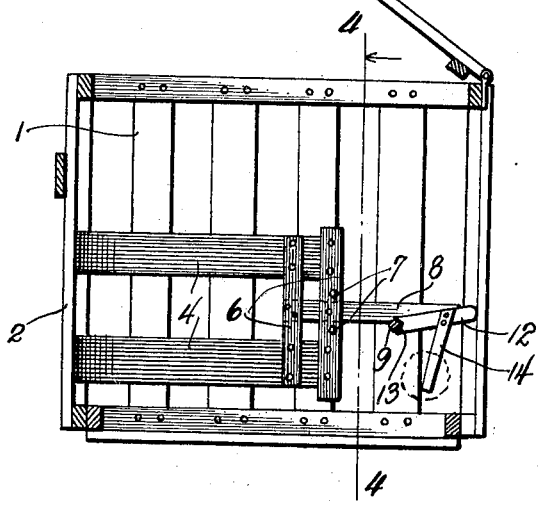
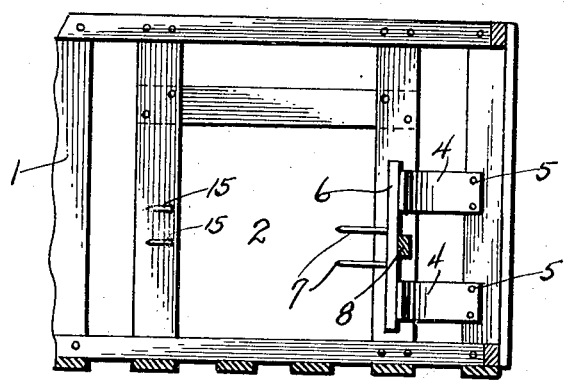
WITNESSES
Guy M. Spring
Wm. H. Mulligan
Inventor
JOSIAH PEAVY
By Richard B. Owen
Attorney

UNITED STATES PATENT OFFICE.

JOSIAH PEAVY, OF CONNELL, TEXAS.

TRAP.

1,330,338.
Specification of Letters Patent. Patented Feb. 10, 1920.

Application filed July 25, 1919. Serial No. 313,285.

*To all whom it may concern:*

Be it knwn that I, JOSIAH PEAVY, a citizen of the United States, residing at Connell, in the county of Orange and State of Texas, have invented certain new and useful Improvements in Traps, of which the following is a specification.

This invention relates to traps and more particularly to a box or cage trap, the primary object being to provide a cage into which the game will be enticed and which will be provided with automatically operated mechanism releasably engaged with a bait carrying member whereby the cage or box will be promptly closed when the game pulls on the bait.

One of the objects of the invention is to provide a trap of this character which will be simple in construction and which may be easily set and which will be equally well adapted for under water trapping as for land trapping.

A further object of this invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Fig. 4 is a section taken on the line 4—4 of Fig. 3, and

Fig. 5 is a detail perspective view of the tripping mechanism for the spring door.

Figure 1:
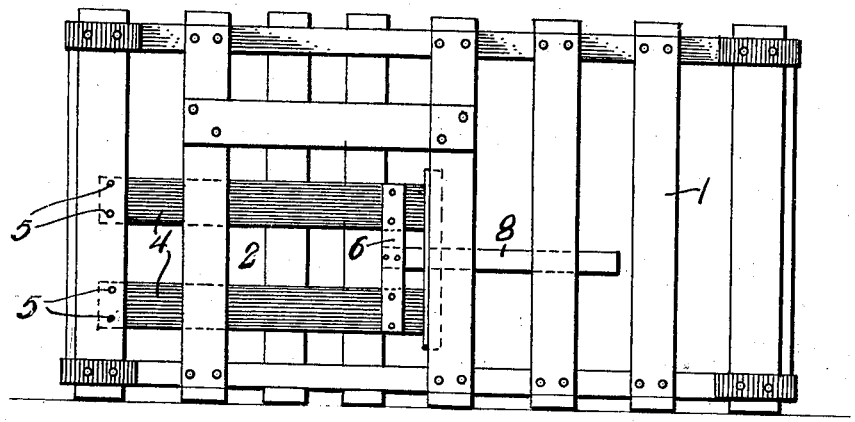
Figure 1 is a side elevation of the trap constructed in accordance with my invention, and showing the same closed.

Referring to the drawings, wherein is illustrated the preferred form of my invention, in which like numerals of reference indicate like or corresponding parts throughout the several views, the body of the trap is constructed of a frame and spaced apart slats 1 forming a substantially box-like structure having the slats sufficiently close to prevent the exit of the game which is to be caught in the trap. As shown in Figs. 1 and 4, the slats at one side of the trap are arranged so that a relatively wide open space 2 is provided forming a door-way through which the game may be admitted. One of the slats has attached thereto a pair of heavy flat springs 4 disposed in vertically spaced relation and fixed to one of the end slats as indicated at 5. The opposite ends of these springs have attached thereto the cleats 6, one of which carries a pair of spurs 7. The cleats also carry a projecting catch arm 8.

Figure 2:
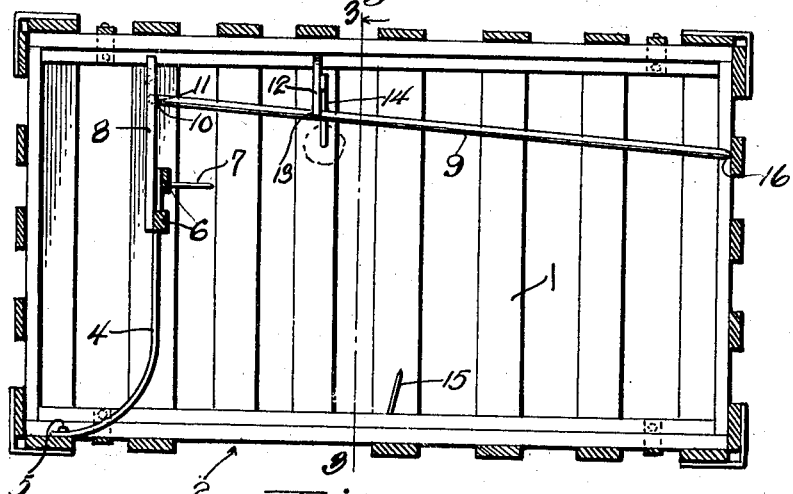
Fig. 2 is a horizontal section through the trap showing the spring door held in open position.

A trip rod 9 extends longitudinally through the trap and has one end notched as indicated at 10 to provide an abutment shoulder 11 adapted to engage the catch arm 8. The opposite end of the trip rod arm 9 is disposed in engagement with one of the end cleats as shown in Fig. 2. A latch member 12 is provided which has one end notched to form a clevis for receiving the trip rod 9 as indicated at 13. The opposite end of the latch member is rounded to engage an adjacent slat in one side of the box structure. This latch member 12 has attached thereto a trigger 14 which serves as a bait carrying member and is adapted to have any suitable bait attached thereto as indicated by dotted lines in the drawing. As shown to advantage in Fig. 3, the latch member 12 is slightly inclined upwardly so that the latch member cannot normally drop between the trip rod 9 and the slat 1 with which it is engaged. Also the trigger member 14 is disposed at an angle with respect to the latch member 12 so that a tendency to pull on the trigger by the game will cause the trip rod to be pulled downwardly by virtue of its engagement in the notch 13 of the latch member. The flat springs 4 serve as a closure for the open space or door-way 2 and one of the upright slats at one side of the door-way is provided with a pair of spurs 15, similar to the spurs 7.

Figure 3:
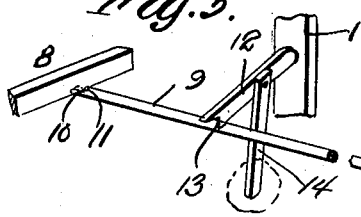
Fig. 3 is a section taken on the line 3—3 of Fig. 2, showing the cover for the trap partially open.

To set the trap, it is necessary to flex the spring members so that they are curved as shown in Fig. 2 whereby the arm 8 will extend practically transversely of the cage or box. The closure is held in this position by placing the trip rod 9 longitudinally of the structure, engaging the arm 8 with the shoulder 11 and permitting the pointed end 16 of the trip rod to engage one of the end slats. The pressure of the spring closure against the trip rod will normally serve to maintain the trip rod in this position whereby the spring closure will be held open. The latch member 12 carrying the trigger 14 is then placed in position so that the notch 13 engages the trip rod and the opposite end of the latch member 12 will engage the adjacent slat although this end will be slightly elevated above the notched end as shown in Fig. 3. When a pull is exerted on the trigger 14, the tendency is to draw the latch member downwardly and since the trip rod 9 is engaged with the notch 13 it will be obvious that the shoulder 11 will be disengaged from the catch arm 8 and the spring members 4 will promptly act to swing the closure forcibly across the opening 12 and the spurs 7 and 15 will overlie each other and frustrate any attempt of the game to force the spring door open.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A trap comprising a box-like body having an open door-way, a spring closure for the door-way equipped with a catch arm, a trip rod normally extending longitudinally of the body and engageable with one end thereof and having a notched end forming a shoulder to engage the said catch arm whereby the spring closure may be held substantially transversely of the body and in open position, and a latch member adapted to engage the trip rod and one side of the said body of the trap and be supported by the trip rod whereby the latter will be pulled out of engagement with the said catch arm when the trip rod is pulled downwardly.

2. A trap comprising a box-like structure having slats at its ends and sides, the slats at one side being disposed to provide a relatively wide open space, a spring closure comprising parallel spring members having cleats secured to their free ends, and adapted to maintain the spring members in parallel relation whereby the latter will close the said open door-way when the closure is in closed position, and a catch arm carried by the cleats, a trip rod having a shoulder formed at one end and engageable with the catch arm and provided with a point to engage one of the cleats at the end of the structure to maintain the closure in open position, and a latch member including a notched piece engageable with the trip rod and having sliding engagement with one of the side slats, and a trigger suspended from the said latch member.

In testimony whereof I affix my signature in presence of two witnesses.

JOSIAH PEAVY.

Witnesses:
  A. W. LAND,
  I. BINGHAM.